July 12, 1938.    G. W. GRISDALE    2,123,724

MEASURING INSTRUMENT

Filed March 16, 1936

Inventor
George W. Grisdale
by McConkey & Booth
Attorneys

Patented July 12, 1938

2,123,724

UNITED STATES PATENT OFFICE 2,123,724

MEASURING INSTRUMENT

George W. Grisdale, Chicago, Ill., assignor to Republic Flow Meters Company, Chicago, Ill., a corporation of Illinois Application March 16, 1936, Serial No. 69,010

5 Claims. (Cl. 74—162)

This invention relates to measuring instruments and more particularly to measuring instruments having an oscillating driving member and a totalizing mechanism and to one-way drive devices therefor.

The present invention is similar to and is in some respects an improvement on the invention of my prior application Serial No. 2,649 filed January 1, 1935, which matured into Patent No. 2,074,585. Like the prior invention, the present invention is particularly adapted for use to operate a totalizer for a measuring instrument of the type disclosed and claimed in the copending application of Otto T. Handwerk, Serial No. 5,779 filed February 9, 1935 and one of its objects is to provide a measuring instrument including a positive and reliable one-way device having a minimum of parts.

Another object is to provide a measuring instrument having a novel adjustment to adjust for lost motion or for wear.

Another object of the invention is to provide a novel one-way drive device which is self adjusting whereby accurate and careful assembly of the parts is unnecessary.

One desirable arrangement according to the invention includes a periodically oscillated lever whose movement in one direction is limited by a cam adjusted according to the condition to be measured. The lever is connected through a novel one-way drive device to a totalizing mechanism and the device includes a certain amount of lost motion which is necessary for proper operation. In order to utilize the full movement of the lever to drive the totalizing mechanism, the lever is preferably moved in the other direction past its zero position an amount equal to the lost motion, an adjustable stop being provided to limit movement of the lever in said other direction.

The one-way drive device includes a gear having an annular flange and a floating lever or bar having a notch to receive the flange. A leaf spring is secured to the bar and lies inside of and engages the flange to bias the bar in one direction and the outer end of the bar lies in a slot in the oscillating lever. Thus when the lever is swung in one direction the sides of the notch in the bar will grip the flange and turn the gear and when the lever is swung in the other direction the notch will slide over the flange. A similar bar is arranged to engage the flange at another point and is held against a stationary abutment by a leaf spring to prevent accidental reverse rotation of the gear.

Other objects, advantages and novel features of the invention will be apparent from the following description when read in connection with the accompanying drawing, in which.

Figure 1:
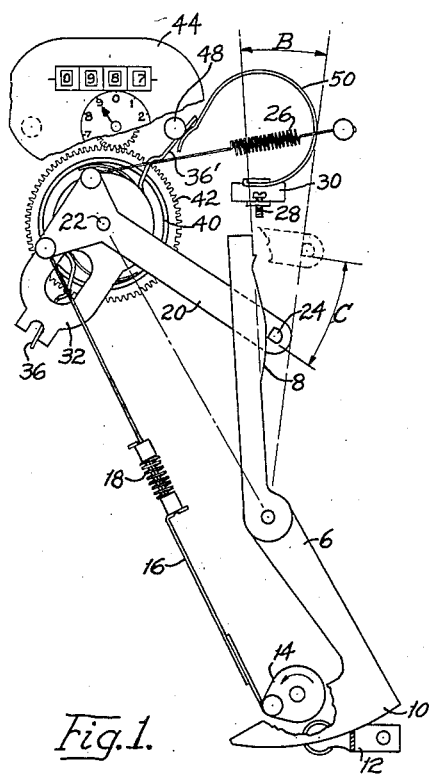
Figure 1 is a partial diagrammatic view of a measuring instrument embodying the invention.
Figure 2:
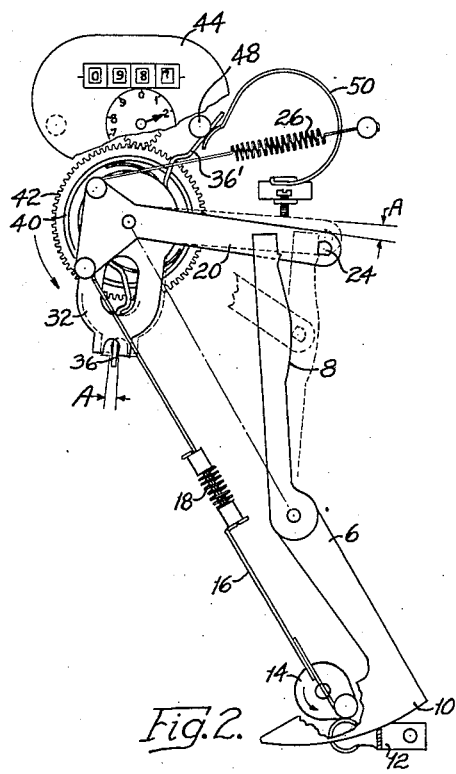
Figure 2 is a view similar to Figure 1 showing a different position of the parts.

The measuring instrument of Figures 1 and 2 is constituted by a cam lever 6 having a cam surface at 8 and an arcuate segment 10. A brake 12 normally engages the segment 10 to hold the lever 6 against movement and is adapted to be released periodically by a constantly rotating cam 14 driven by an electric motor or other suitable source of power. When the brake 12 is released the angular position of the cam lever is adjusted in accordance with the instantaneous value of the condition to be measured in any suitable manner, as by the mechanism more particularly disclosed and claimed in the copending Handwerk application mentioned above.

The cam 14 is connected through a connecting rod 16 having a yielding connection 18 therein with one arm of a bell crank lever 20 which is mounted to oscillate about a fixed axle 22. The lever 20 carries a pin 24 adapted to engage the cam surface 8 to limit movement of the lever in one direction in accordance with the position of the cam lever 6 and a spring 26 is connected to the lever 20 to urge it constantly in a direction toward the cam lever 6. Movement of the lever 20 in the other direction is limited by an adjustable stop 28 secured to a fixed bracket 30.

A member 32 formed as an extension of or suitably secured to the lever 20 has a pair of spaced prongs 34 forming a notch to receive the end of a floating lever or bar 36. The bar 36 is formed with a notch 38 adapted to receive an annular flange 40 on a gear 42 which is mounted on the axle 22 and geared to a veedor counter 44 or other suitable type of totalizing mechanism. The inner end of the bar 36 carries an arcuate leaf spring 46 lying within and engaging the flange 40 to urge the bar in a direction such that the notch 38 will bind on the flange. It will be noted that the member 32 overlies the open end of the flange 40 and prevents the bar 36 from dropping out.

In order to hold the gear 42 against undesired reverse rotation, a second bar 36' has a notch 38' which engages the flange 40 at a different point and has its outer end held in engagement with a fixed pin 48 by means of a leaf spring 50 which may be anchored on the bracket 30. In this way the bar is held firmly against the pin 48 so that there is no lost motion and the end of the bar is permitted to slide slightly lengthwise over the pin and the end of the spring 50 during operation. A spring 46' similar to the spring 46 is carried by the bar 36' and engages the flange 40.

It will be noted that there is a certain definite amount of lost motion between the end of the bar 36 and the prongs 34, this being necessary for proper operation of the device. In order to insure that this lost motion shall not interfere with proper operation of the device, the lever 20 is arranged to swing past its position corresponding to a zero setting of the cam lever 6 before engaging the stop 28. As best seen in Figure 2, the lever 20 and member 32 move through the indicated angle A from a position with one prong 34 engaging the bar 36 to a position in which the other prong 34 engages the bar and this angular movement is lost motion. The lever 20 is shown in full lines in its zero position and the stop 28 is so adjusted that the lever will move into its upper dotted position at its upper extreme of movement, this being through the same angle A past zero. Thus the lost motion between the bar 36 and lever 20 is all taken up by movement of the lever 20 past zero and all movement of the lever 20 beyond zero will be effective to operate the totalizing mechanism. Any wear in the parts may also be adjusted for by the stop 28 so that an accurate indication is obtained at all times and the provision of this adjustable stop on a stationary part enables the adjustment to be made readily during operation.

The mounting of the levers or bars 36 and 36' without any fixed pivots or the like enables them to center themselves properly under the influence of the springs 46 and 46' and eliminates the necessity for extreme accuracy in their manufacture or assembly. At the same time they are positive in their action and are extremely unlikely to be damaged or otherwise to get out of order.

With the parts properly adjusted and the cam 14 rotating the lever 20 will be oscillated about its axis by the connecting rod 16 and spring 26 from its extreme upper position indicated in dotted lines in Figure 2 to a position in which the pin 24 engages the cam surface 8. When the cam 14 is in the position shown in Figure 2 the brake 12 will be disengaged and the cam lever 6 will be moved to a position corresponding to the value of the condition being measured. At the same time the lever 20 will be raised to its upper position against the stop 28, the yielding connection 18 yielding at this time if the lever 20 engages the stop before the cam reaches its position with the connecting rod 16 alined with its axis. As the cam rotates farther toward the position shown in Figure 1 the brake 12 will be released and permitted to reengage the segment 10 to hold the cam arm 6 against movement. At the same time the lever 20 will be permitted to swing about its pivot until the pin 24 engages the cam surface 8, further movement of the cam without affecting the lever 20 being made possible by the yielding connection 18.

As shown in Figure 1, the cam lever 6 has moved through an angle B from its zero position, this angle being a measure of and proportional to some function of the condition to be measured. This position of the lever 6 permits the lever 20 to move through the angle C from its zero position before the pin 24 engages the cam surface 8 and by properly designing this cam surface the angle C may be made equal to or equal to some function such as the square or square root of the angle B. In any event the angular movement of the lever 20 will be determined by the position of the cam lever 6 and will bear a definite predetermined relationship to the value of the condition being measured.

Figure 3:
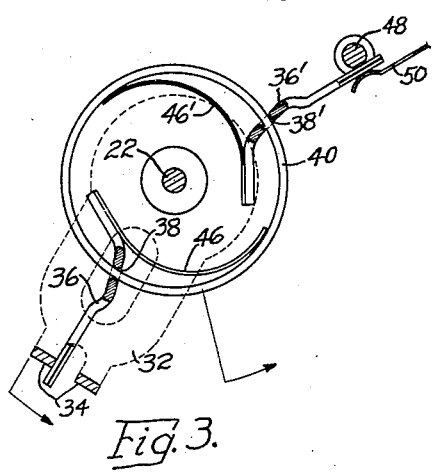
Figures 3 and 4 are partial sections of the one-way drive device showing the parts in different positions.

As the lever 20 swings about its pivot from the full line position of Figure 1 toward its zero position, the prongs 34 will engage the end of the bar 36 and move it a similar amount in the direction of the arrow in Figure 3. This will cause the sides of the slot 38 to bind on the flange 40 and turn the gear 42 an amount equal to the movement of the lever 20. At this time the bar 36' will be swung about the pin 48 to a position with the sides of the slot 38' parallel to the flange 40 so that the flange can slide through the slot.

Figure 4:
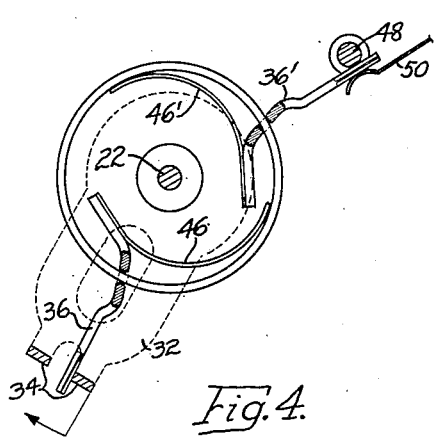
Figure 5:
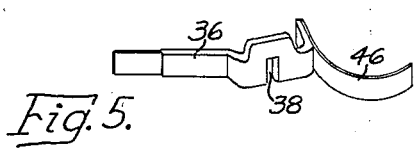
Figure 5 is a perspective view of a detail.

As the lever 20 is again lowered toward the cam lever 6 the member 32 will be moved in the direction of the arrow in Figure 4 to move the bar 36 into a position in which the flange 40 can slide through the slot 38. At the same time the slot 38' in the bar 36' will bind on the flange 40 and the bar 36' will bear against the end of the spring 50 to hold the flange 40 and gear 42 against reverse rotation.

While only one embodiment of the invention has been shown and described, it will be apparent that many changes might be made therein and it is not intended to be limited to the exact form shown or otherwise than by the terms of the appended claims.

What is claimed is:

1. A one-way drive device comprising a driven member, an oscillating driving member, a freely floating third member engageable with the driven member, a resilient member engageable with the driven member and said third member for urging the third member into a position to engage the driven member, and means on the driving member to engage said third member, whereby the third member will drive the driven member in one direction but not in the other direction.

2. A one-way drive device comprising a driven member, an oscillating driving member, a freely floating third member engageable with the driven member, a resilient member engageable with the driven member and said third member for urging the third member into a position to engage the driven member, means on the driving member to engage said third member, whereby the third member will drive the driven member in one direction but not in the other direction, and means engageable with the driven member and with a relatively stationary part to prevent rotation of the driven member in said other direction.

3. A one-way drive device comprising a driven member having an annular flange, an oscillating driving member, a floating lever having a notch therein to receive said flange, a leaf spring secured to said lever within the flange and engaging the flange to bias the lever in one direction, and means on the driving member to engage the lever, thereby to cause the floating lever to drive the driven member in one direction but not in the other.

4. A one-way drive device comprising a driven member, an oscillating driving member, a one-way drive connection between the driving and driven members, a floating member engageable with the driven member, resilient means engaging the driven member and the floating member to urge the floating member into engagement with the driven member, a fixed abutment engageable with one end of the floating member to prevent movement thereof in one direction and resilient means urging said floating member against the abutment and acting to resist movement thereof in the other direction.

5. A one-way drive device comprising a driven member having an annular flange, an oscillating driving member, a one-way drive connection between the driving and driven members, a floating lever having a notch to receive said flange, a leaf spring secured to the lever and engaging the flange to bias the lever in one direction, a stationary abutment engageable with the lever to prevent movement thereof in one direction, and a leaf spring urging the lever against the abutment and opposing movement thereof in the other direction.

GEORGE W. GRISDALE.